(12) United States Patent
Ghanbaran et al.

(10) Patent No.: US 10,223,239 B1
(45) Date of Patent: Mar. 5, 2019

(54) DEFINITION-DRIVEN TEST AGENT

(71) Applicant: EMC IP Holding Company LLC, Hopkinton, MA (US)

(72) Inventors: Mojgan Ghanbaran, Emerald Hills, CA (US); Srinivas Paranthanate, Sunnyvale, CA (US); Jingwen Zhang, Sunnyvale, CA (US); Naveen Rastogi, San Jose, CA (US); Yingjie Ma, San Jose, CA (US); Zhiying Lin, San Jose, CA (US); Alan D. Davie, Fremont, CA (US); Duc The Dang, San Jose, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 1 day.

(21) Appl. No.: 15/282,852

(22) Filed: Sep. 30, 2016

(51) Int. Cl.
| | | |
|---|---|---|
| *G06F 9/44* | (2018.01) | |
| *G06F 11/36* | (2006.01) | |
| *H04L 29/08* | (2006.01) | |
| *G06F 17/22* | (2006.01) | |

(52) U.S. Cl.
CPC ........ *G06F 11/3664* (2013.01); *G06F 17/227* (2013.01); *H04L 67/02* (2013.01)

(58) Field of Classification Search
CPC ..... G06F 11/3664; G06F 17/227; H04L 67/02
USPC ................. 717/114–115, 124–125
See application file for complete search history.

(56) References Cited

U.S. PATENT DOCUMENTS

| | | | | |
|---|---|---|---|---|
| 8,745,641 | B1 * | 6/2014 | Coker ................. | G06F 11/3668 719/313 |
| 9,652,269 | B2 * | 5/2017 | Prabhakar ........... | G06F 9/45529 |
| 9,720,800 | B2 * | 8/2017 | Li ........................ | G06F 11/3616 |
| 9,736,231 | B1 * | 8/2017 | Abrams .............. | H04L 67/1002 |

OTHER PUBLICATIONS

Oracle, "Oracle Fusion Middleware—Developing Services with Oracle Service Bus", Nov. 2015, Oracle Corporation, Chapters 26-29, 43, Appendix A, 117 pages.*
SmartBear Software, "Working with REST Requests", Mar. 2015, retrieved from https://web.archive.org/web/20150331091917/https://www.soapui.org/rest-testing/working-with-rest-requests.html, 8 pages.*

* cited by examiner

*Primary Examiner* — Ted T. Vo
(74) *Attorney, Agent, or Firm* — Womble Bond Dickinson (US) LLP (57) ABSTRACT

One embodiment is related to a method for testing representational state transfer (REST) application program interfaces (APIs), comprising: parsing service specification files; prompting, based on the service specification files, a user to select a resource to be tested and to provide relevant request payload field inputs; receiving resource selection and request payload field inputs from the user; converting the request payload field inputs into JavaScript Object Notation (JSON) and/or Extended Markup Language (XML) data; submitting the JSON and/or XML data to a web services host with a hypertext transfer protocol (HTTP) REST request; receiving a response from the web services host in a form of JSON and/or XML data; and presenting the response to the user.

21 Claims, 6 Drawing Sheets

DEFINITION-DRIVEN TEST AGENT

FIELD OF THE INVENTION

Embodiments of the disclosure are related to web services, and more particularly, to a method, apparatus, and system for testing web APIs.

BACKGROUND

Many products, such as EMC Data Domain Management Center (DDMC) and Data Domain Replicator (DDR), provide functionalities through hypertext transfer protocol (HTTP)-based web services. In particular, users may access the functionalities by invoking representational state transfer (REST) application program interfaces (APIs).

The vendor of a product may need to test the REST APIs, for example, during the product development or quality assurance (QA) procedures. Existing solutions for testing the REST APIs, such as Google's Advanced REST client, may be cumbersome to use in some aspects for developers and QA personnel alike: the process may consist of composing complex JavaScript Object Notation (JSON) or Extended Markup Language (XML) data that are manually entered into a form and submitted to a web services host (e.g., a server) to obtain the result. Since the JSON or XML data may comprise nested lists and/or multiple complex types, the process may be time-consuming and error-prone.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the disclosure are related to an apparatus, method, and system of implementing a definition-driven test agent that 1) parses service specification files, 2) prompts, based on the service specification files, a user to select a resource to be tested and to provide relevant request payload field inputs, 3) receives resource selection and request payload field inputs from the user, 4) converts the request payload field inputs into JSON and/or XML data, 5) submits the JSON and/or XML data to a web services host with an HTTP REST request, 6) receives a response from the web services host in a form of JSON and/or XML data, and 7) presents the response to the user.

In one embodiment, the service specification files may comprise a Web Application Description Language (WADL) file and an XML schema file. As is known in the art, a WADL file may describe web services that a web server provides and specify the way clients may use the web services provided. A WADL file may comprise one or more of: 1) a set of resources that the server offers, 2) the relationships between the resources, 3) methods that may be applied to each resource (e.g., the expected input/output and the supported format), and 4) resource representation formats (e.g., the supported Multipurpose Internet Mail Extensions "MIME" types and data schemas in use, such as "application/xml," or "application/json").

An XML schema file may specify the way elements are described in an XML document and may be used to describe expected inputs and outputs of the web services.

Therefore, the service specification files may completely specify the inputs and outputs of the web services of a host but may not include the implementation details of the web services on the host side.

Therefore, the service specification files may be parsed to identify the resources (including supported methods) and the request payload fields associated with each resource. In one embodiment, the service specification files may be parsed with tools of the jQuery library (the jQuery library is a JavaScript library for client-side HTML scripting).

The definition-driven test agent implemented may provide two different modes: Strict mode and Free Format mode. In the Strict mode, the user may be prompted to provide inputs to each request payload field as identified from the service specification files. In the Free Format mode, the user may be allowed more flexibility to manipulate Uniform Resource Identifiers (URIs) and/or the JSON/XML data.

Further, the definition-driven test agent implemented may 1) display a hierarchical presentation of all available resources of the web services and allow hiding or showing the resources as needed, 2) provide the ability to choose JSON or XML data format combinations for request or response data, 3) present each resource in a structured user interface through a web browser, 4) provide the ability to form complex type data including nested lists quickly and automatically generate the request data, and 5) read back and format the response data and allow a user to navigate to other resources presented through the links in the response.

Figure 1:
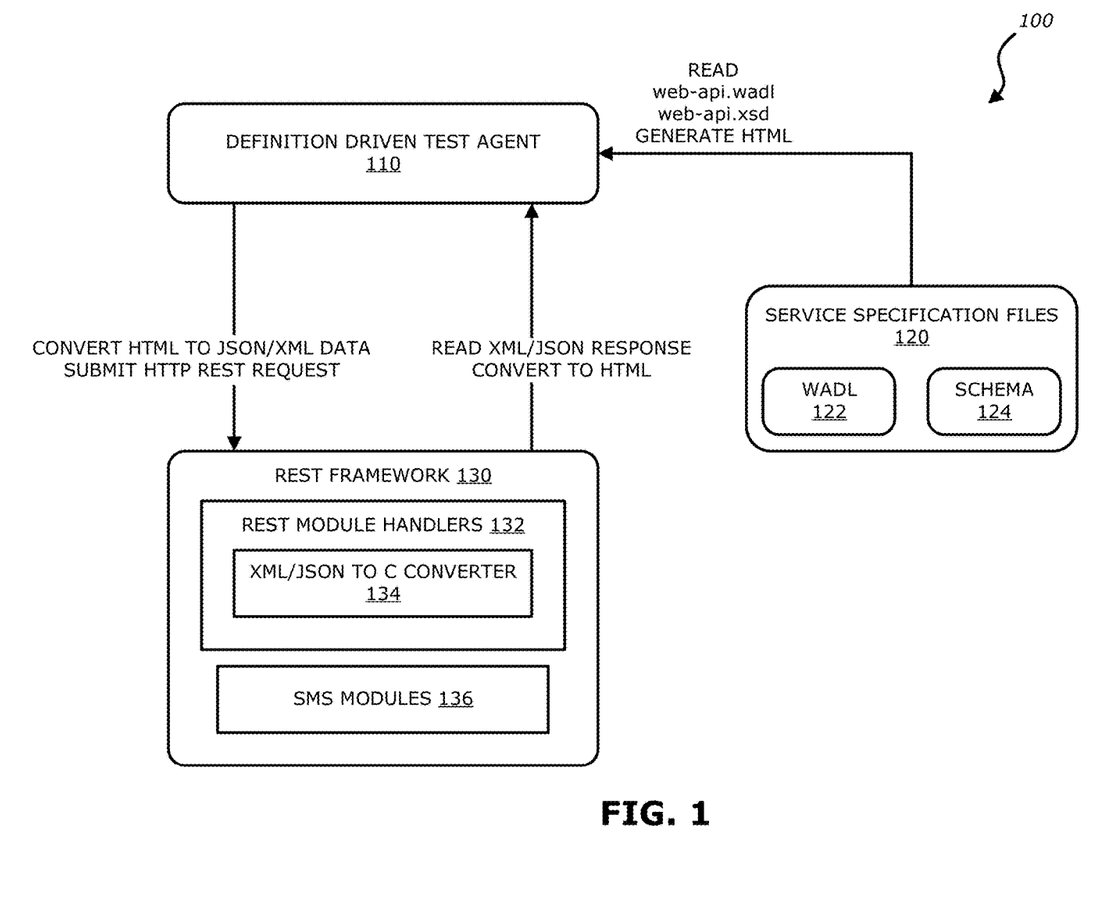
FIG. 1 is a block diagram illustrating an environment according to one embodiment of the disclosure.

Referring to FIG. 1, a block diagram illustrating an example environment 100 according to one embodiment of the disclosure is shown. The definition-driven test agent 110 may 1) parses service specification files 120, 2) prompts, based on the service specification files, a user to select a resource (and a method associated with the resource) to be tested and to provide relevant request payload field inputs, 3) receives resource selection and request payload field inputs from the user, 4) converts the request payload field inputs into JSON and/or XML data, 5) submits the JSON and/or XML data to a web services host with an HTTP REST request, 6) receives a response from the web services host in a form of JSON and/or XML data, and 7) presents the response to the user.

The definition-driven test agent 110 may be hosted at a web server and accessed through a web browser. Therefore, in one embodiment, Hypertext Markup Language (HTML) documents may be generated for information presented to the user, such as the resource selection prompt, request payload field input prompts, and responses from the web services host being tested. The inputs received from the user may be initially in the form of HTML documents and may be converted to other forms of data, such as JSON/XML data, as needed.

The service specification files 120 may comprise a WADL file 122 (e.g., web-api.wadl) and an XML schema file 124 (e.g., web-api.xsd). The REST framework 130 may be implemented as part of the web services being tested and hosted on the web services host. The REST framework 130 may comprise REST module handlers 132, which may further comprise an XML/JSON to C converter 134. In one embodiment, the REST framework 130 may also comprise Short Message Service (SMS) modules 136.

Figure 2:
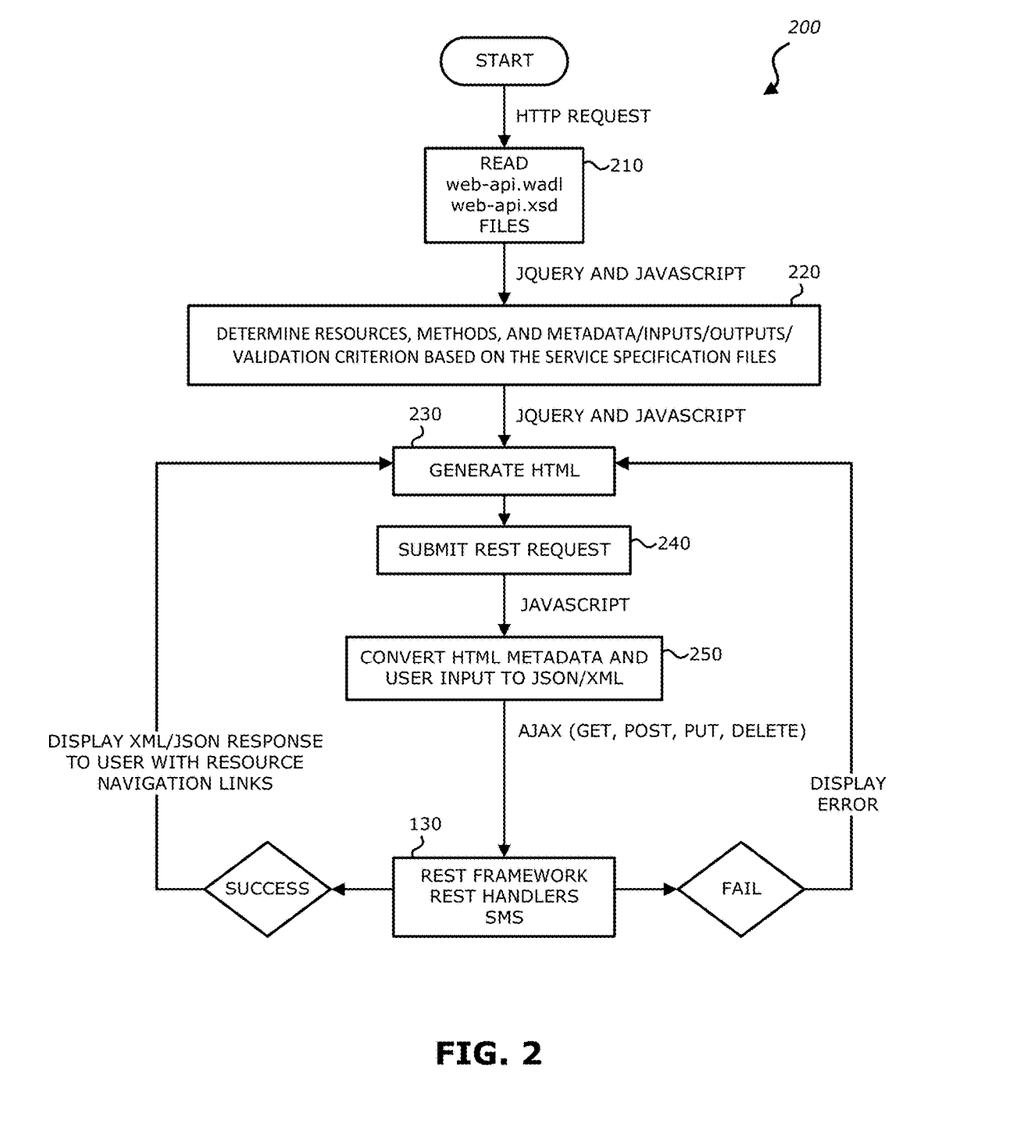
FIG. 2 is a flowchart illustrating an example method for testing REST APIs.

Referring to FIG. 2, a flowchart illustrating an example method 200 for testing REST APIs is shown. At block 210, service specification files including a WADL file (e.g., web-api.wadl) and an XML schema file (e.g., web-api.xsd) may be read in response to an HTTP request. At block 220, resources of the web services, methods supported by the resources, and metadata/inputs/outputs/validation criterion associated with the methods may be determined based on service specification files using the jQuery library and JavaScript. The user interface to be presented may indicate the resources, the methods, and the metadata/inputs/outputs/validation criterion. At block 230, an HTML document may be generated using the jQuery library and JavaScript to present the user interface including prompts for user selection and inputs in a browser. At block 240, once the user selection and inputs are received and in response to a user command, a REST request may be submitted. At block 250, the HTML metadata and user inputs in the REST request may be converted to JSON/XML data using JavaScript. The JSON/XML data may be submitted to the REST framework 130 with an asynchronous JavaScript and XML (Ajax) request (with a GET, POST, PUT, DELETE, etc., method). If the test is successful and the REST framework 130 returns a response in the form of JSON/XML data, the response may be converted to an HTML document at block 230 to be presented to the user. The response presented to the user may comprise links to other resources. If the test is a failure, an HTML document may be generated at block 230 to display an error message to the user.

Figure 3:
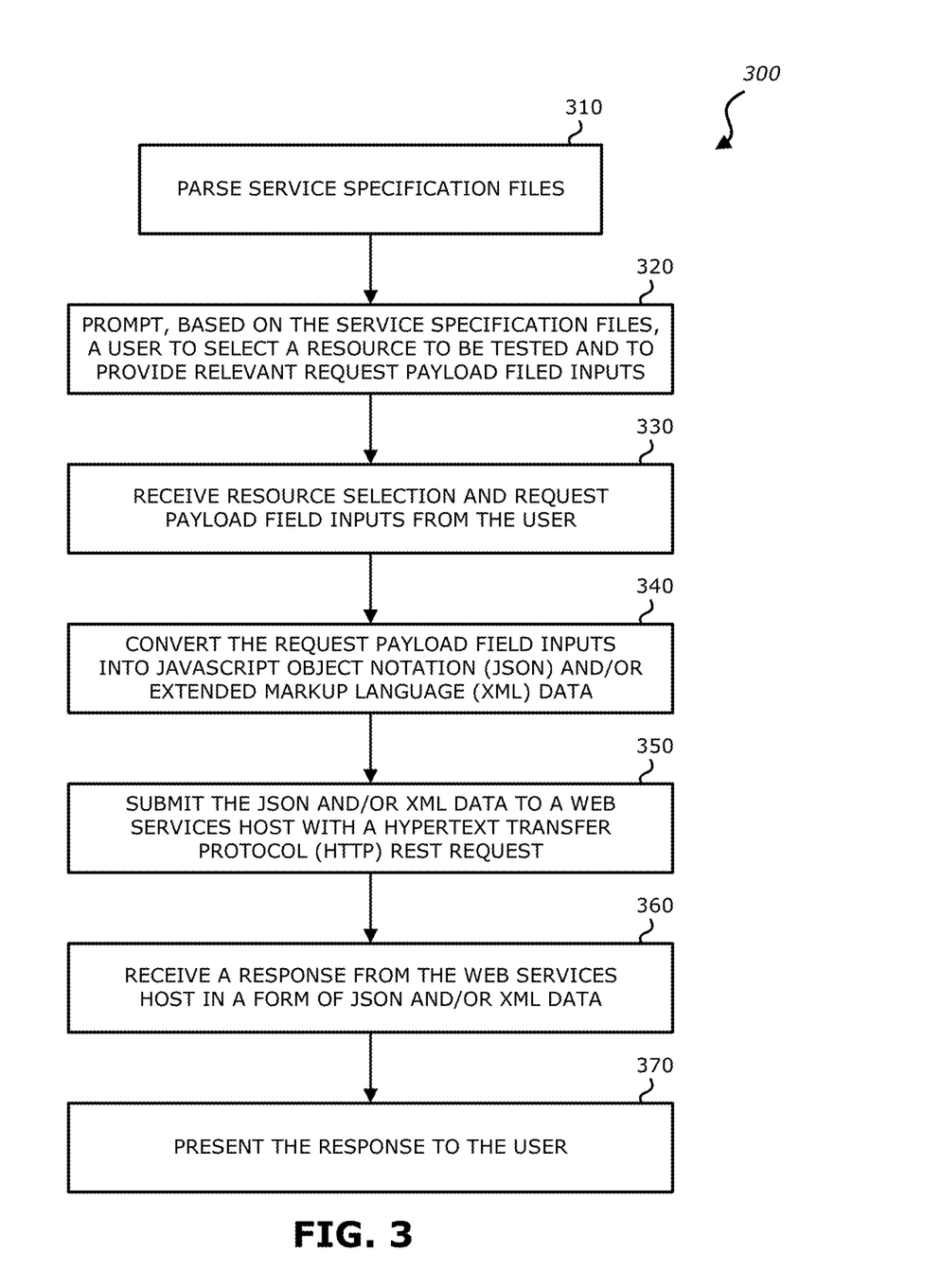
FIG. 3 is a flowchart illustrating an example method for testing REST APIs.

Referring to FIG. 3, a flowchart illustrating an example method 300 for testing REST APIs is shown. At block 310, service specification files may be parsed. At block 320, a user may be prompted, based on the service specification files, to select a resource to be tested and to provide relevant request payload field inputs. At block 330, resource selection and request payload field inputs from the user may be received. At block 340, the request payload field inputs may be converted into JSON and/or XML data. At block 350, the JSON and/or XML data may be submitted to a web services host with an HTTP REST request. At block 360, a response may be received from the web services host in a form of JSON and/or XML data. At block 370, the response may be presented to the user.

Figure 4A:
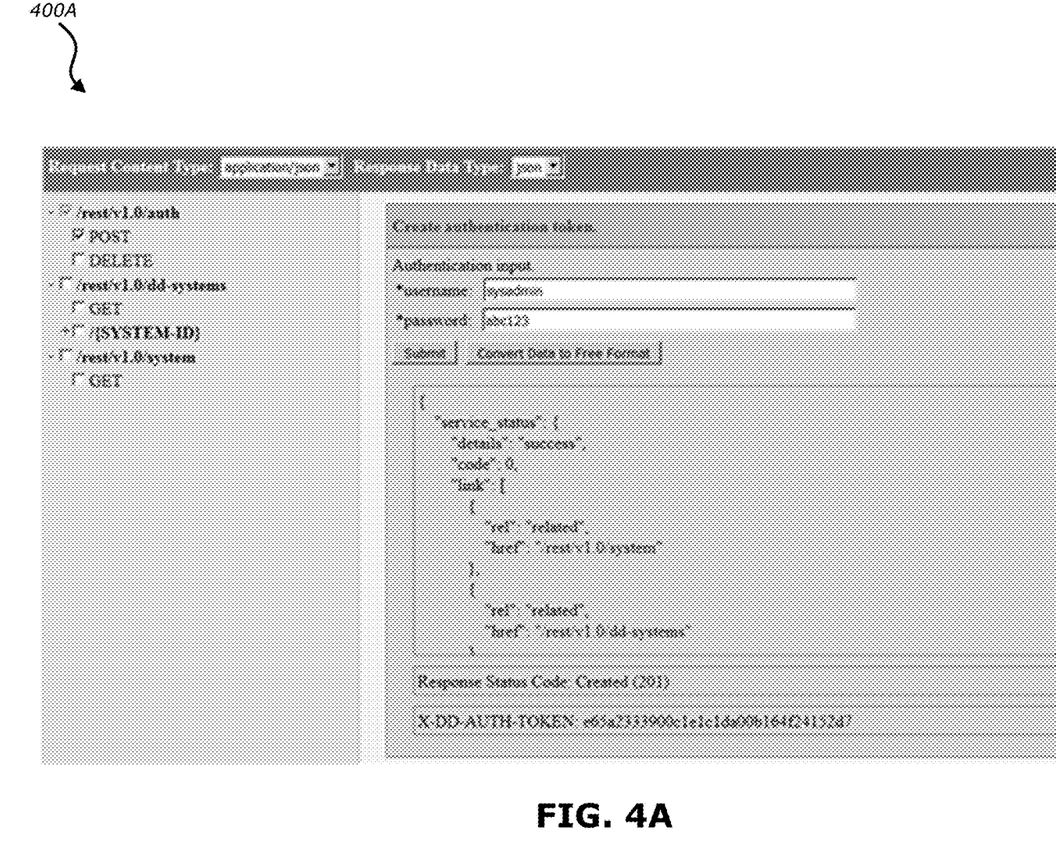
FIGS. 4A and 4B are diagrams illustrating example user interfaces of a definition-driven test agent.
Figure 4B:
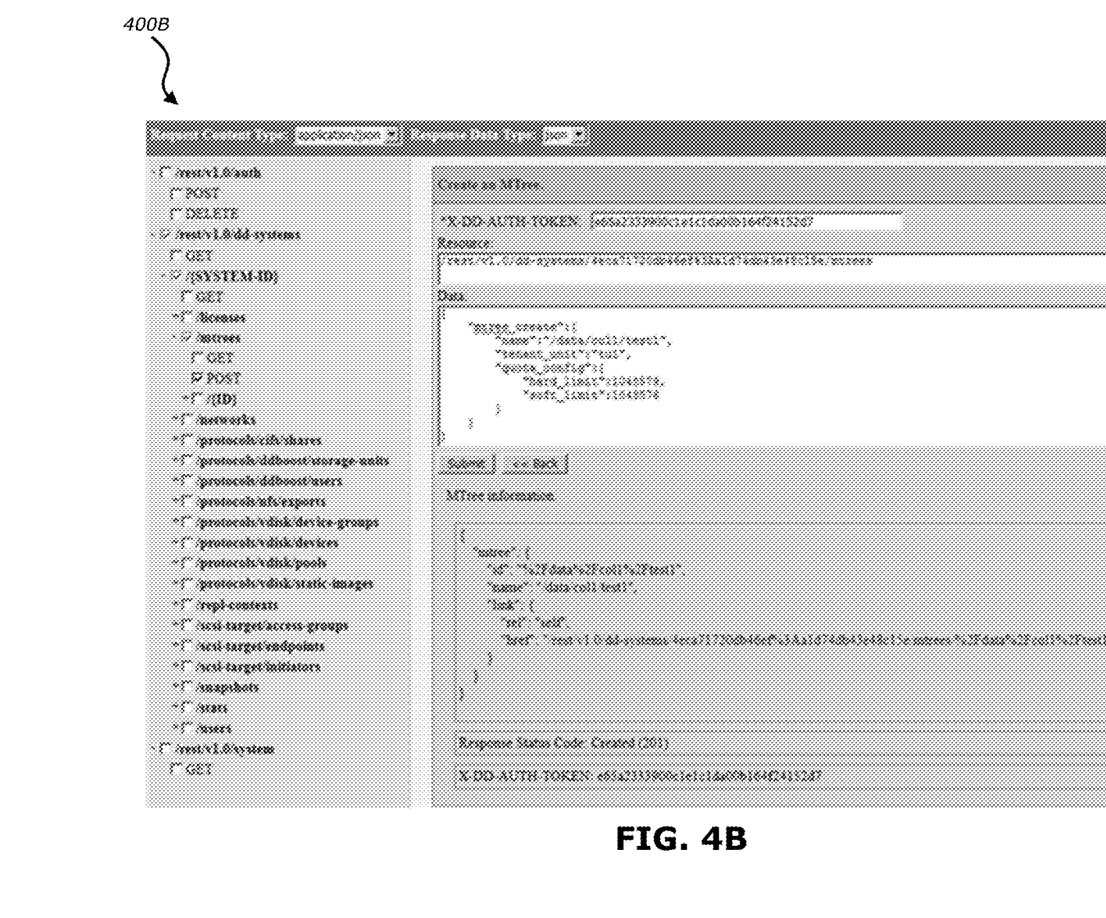

Referring to FIGS. 4A and 4B, diagrams illustrating example user interfaces 400A and 400B of a definition-driven test agent are shown. FIG. 4A illustrates a user interface 400A in a Strict mode. As illustrated in FIG. 4A, a user sends a "POST/rest/v1.0/auth" ("/rest/v1.0/auth" being the resource selected for testing, and POST being the method selected) request with a username (sysadmin) and a password (abc123) to a web services host to obtain an authentication token (e65a2333900c1e1c1da00b164f24152d7). The response body (with "service status", etc.) and the response status code of 201 indicating a success are also shown on the user interface 400A.

FIG. 4B illustrates a user interface 400B in a Free Format mode. As illustrated in FIG. 4B, a user sends a "POST/rest/v1.0/dd-systems/{SYSTEM-ID}/mtrees" ("/rest/v1.0/dd-systems/{SYSTEM-ID}/mtrees" being the resource selected for testing, and POST being the method selected) request to create an Mtree on a managed system. The user inputs include the authentication token (e65a2333900c1e1c1da00b164f24152d7), the resource URI, and the request body. The user has the flexibility of editing the JSON data in the the request body. The response including the response status code of 201 indicates that the Mtree has been created. The response body indicates the information about the created Mtree including a link to the Mtree.

Methods 200, 300 may be performed by processing logic that includes hardware (e.g. circuitry, dedicated logic, etc.), software (e.g., embodied on a non-transitory computer readable medium), or a combination thereof. For example, methods 200, 300 may be performed by processors 1501 of FIG. 5. Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

One embodiment of the disclosure is related to a data processing system, comprising: a processor; and a memory coupled to the processor storing instructions which, when executed by the processor, cause the processor to perform testing operations, the operations including parsing service specification files; prompting, based on the service specification files, a user to select a resource to be tested and to provide relevant request payload field inputs; receiving resource selection and request payload field inputs from the user; converting the request payload field inputs into JavaScript Object Notation (JSON) and/or Extended Markup Language (XML) data; submitting the JSON and/or XML data to a web services host with a hypertext transfer protocol (HTTP) REST request; receiving a response from the web services host in a form of JSON and/or XML data; and presenting the response to the user.

Therefore, according to the embodiments of the disclosure herein, REST APIs may be tested with a definition-driven test agent that generates a user interface and prompts user inputs based on service specification files. The user may select the resource to be tested (and a method) from a list and provide request payload field inputs in a structured manner. The response information may be presented in a form that is easy to understand. Manual entry of complex data may be minimized or eliminated. Therefore, with the help of the definition-driven test agent, testing of REST APIs may become more efficient.

Figure 5:
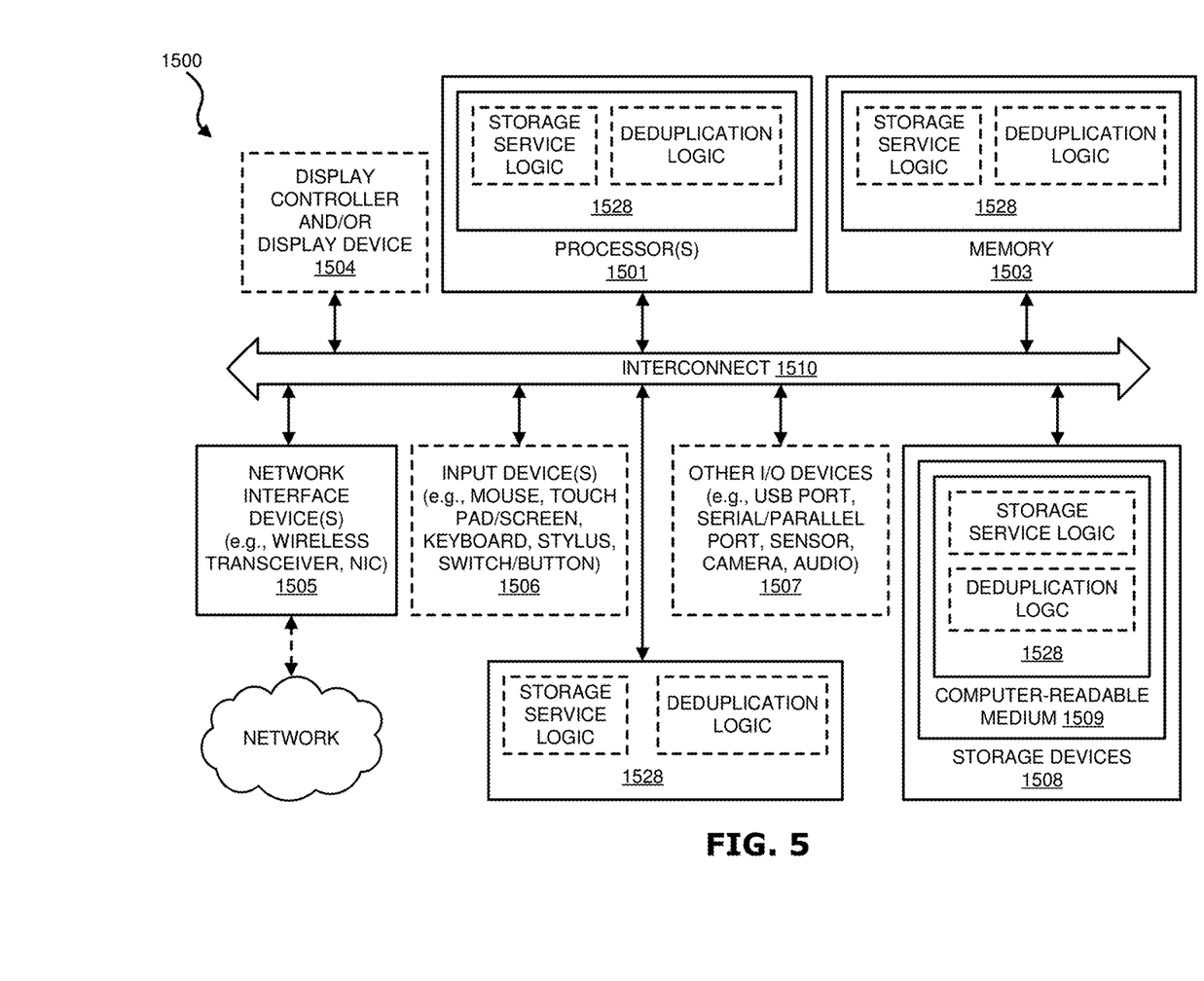
FIG. 5 is a block diagram illustrating an example of a data processing system which may be used with one embodiment of the disclosure.

FIG. 5 is a block diagram illustrating an example of a data processing system 1500 which may be used with one embodiment of the disclosure. For example, system 1500 may represents any of data processing systems described above performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for testing representational state transfer (REST) application program interfaces (APIs), comprising:
    parsing service specification files to obtain a list of one or more resources of a web service, each resource being associated with one or more applicable methods;
    prompting, based on the service specification files, a user to select a resource from the list of the one or more resources and a method associated with the resource to be tested and to provide relevant request payload field inputs;
    receiving resource and method selection and request payload field inputs from the user;
    converting the request payload field inputs into JavaScript Object Notation (JSON) and/or Extended Markup Language (XML) data;
    submitting, using the user-selected method to be tested, the JSON and/or XML data to a web services host with a hypertext transfer protocol (HTTP) REST request;

receiving a response from the web services host in a form of JSON and/or XML data; and presenting the response to the user.

2. The method of claim 1, wherein the service specification files comprise a Web Application Description Language (WADL) file and an XML schema file.

3. The method of claim 1, wherein the service specification files are parsed with a jQuery library.

4. The method of claim 1, wherein interactions with the user are through a web browser.

5. The method of claim 1, wherein presenting the response to the user comprises converting the response to a hypertext markup language (HTML) document.

6. The method of claim 1, wherein the request payload field inputs are received from the user in a Strict mode.

7. The method of claim 1, wherein the request payload field inputs are received from the user in a Free Format mode.

8. A non-transitory machine-readable medium having instructions stored therein which, when executed by a processor, cause the processor to perform testing operations, the operations comprising:

parsing service specification files to obtain a list of one or more resources of a web service, each resource being associated with one or more applicable methods;

prompting, based on the service specification files, a user to select a resource from the list of the one or more resources and a method associated with the resource to be tested and to provide relevant request payload field inputs;

receiving resource and method selection and request payload field inputs from the user;

converting the request payload field inputs into JavaScript Object Notation (JSON) and/or Extended Markup Language (XML) data;

submitting, using the user-selected method to be tested, the JSON and/or XML data to a web services host with a hypertext transfer protocol (HTTP) REST request;

receiving a response from the web services host in a form of JSON and/or XML data; and presenting the response to the user.

9. The non-transitory machine-readable medium of claim 8, wherein the service specification files comprise a Web Application Description Language (WADL) file and an XML schema file.

10. The non-transitory machine-readable medium of claim 8, wherein the service specification files are parsed with a jQuery library.

11. The non-transitory machine-readable medium of claim 8, wherein interactions with the user are through a web browser.

12. The non-transitory machine-readable medium of claim 8, wherein presenting the response to the user comprises converting the response to a hypertext markup language (HTML) document.

13. The non-transitory machine-readable medium of claim 8, wherein the request payload field inputs are received from the user in a Strict mode.

14. The non-transitory machine-readable medium of claim 8, wherein the request payload field inputs are received from the user in a Free Format mode.

15. A data processing system, comprising:

a processor; and a memory coupled to the processor storing instructions which, when executed by the processor, cause the processor to perform testing operations, the operations including parsing service specification files to obtain a list of one or more resources of a web service, each resource being associated with one or more applicable methods;

prompting, based on the service specification files, a user to select a resource from the list of the one or more resources and a method associated with the resource to be tested and to provide relevant request payload field inputs;

receiving resource and method selection and request payload field inputs from the user;

converting the request payload field inputs into JavaScript Object Notation (JSON) and/or Extended Markup Language (XML) data;

submitting, using the user-selected method to be tested, the JSON and/or XML data to a web services host with a hypertext transfer protocol (HTTP) REST request;

receiving a response from the web services host in a form of JSON and/or XML data; and presenting the response to the user.

16. The data processing system of claim 15, wherein the service specification files comprise a Web Application Description Language (WADL) file and an XML schema file.

17. The data processing system of claim 15, wherein the service specification files are parsed with a jQuery library.

18. The data processing system of claim 15, wherein interactions with the user are through a web browser.

19. The data processing system of claim 15, wherein presenting the response to the user comprises converting the response to a hypertext markup language (HTML) document.

20. The data processing system of claim 15, wherein the request payload field inputs are received from the user in a Strict mode.

21. The data processing system of claim 15, wherein the request payload field inputs are received from the user in a Free Format mode.

* * * * *